No. 767,427. PATENTED AUG. 16, 1904.
W. OLDFIELD.
FILLING FEEDER FOR WEFT REPLENISHING LOOMS.
APPLICATION FILED JUNE 2, 1904.
NO MODEL.
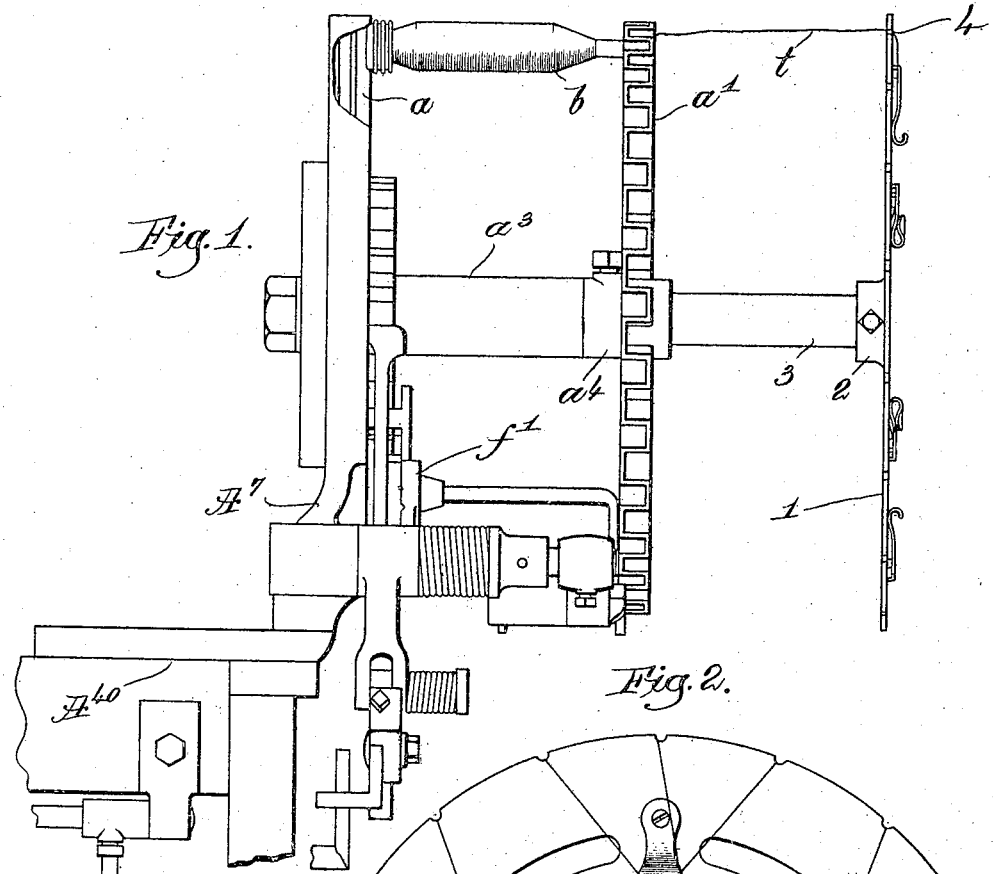
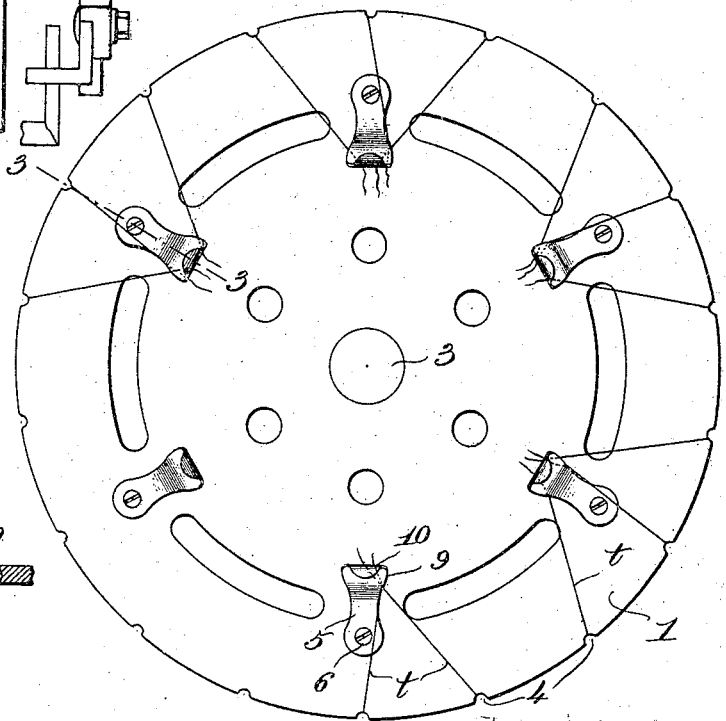
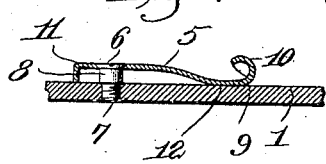

No. 767,427.

Patented August 16, 1904.

UNITED STATES PATENT OFFICE.

WILLIAM OLDFIELD, OF NEW BEDFORD, MASSACHUSETTS, ASSIGNOR TO DRAPER COMPANY, OF HOPEDALE, MASSACHUSETTS, A CORPORATION OF MAINE.

FILLING-FEEDER FOR WEFT-REPLENISHING LOOMS.

SPECIFICATION forming part of Letters Patent No. 767,427, dated August 16, 1904.

Application filed June 2, 1904. Serial No. 210,804. (No model.)

*To all whom it may concern:*

Be it known that I, WILLIAM OLDFIELD, a citizen of the United States, and a resident of New Bedford, county of Bristol, State of Massachusetts, have invented an Improvement in Filling-Feeders for Filling-Replenishing Looms, of which the following description, in connection with the accompanying drawings, is a specification, like characters on the drawings representing like parts.

This invention relates particularly to rotatable filling-feeders used on automatic looms of the "Northrup" type, such as is shown in United States Patent No. 529,940; and it has for its object the production of novel means for holding the filling ends at the outer end of the feeder.

In the patent referred to the filling ends are led over the notched or toothed edge of a disk rotatable with the feeder and then wrapped about a central stud.

In accordance with my present invention I have dispensed with the central stud and mount a series of clip-like holding devices or filling-clamps on the outer face of the notched plate near its periphery, each of such devices serving to clamp the filling ends led from several filling carriers or bobbins. By such location of the clamping or holding devices the operative can bring the filling ends more quickly into engagement therewith, requiring no wrapping or twisting movement of the hand, and each clamp is so near the periphery of the notched guide-plate that the operative can handle the filling ends more readily and conveniently.

Figure 1 is a front elevation, partly broken out, of a filling-feeder of the type referred to with my present invention applied thereto. Fig. 2 is an outer face view of the guide-plate on which the holding devices for the filling ends are mounted; and Fig. 3 is an enlarged sectional detail of such plate and a holding device, taken on the line 3 3, Fig. 2.

Referring to Fig. 1, the stand $A^7$, mounted on the breast-beam $A^{40}$, rotatably supports the feeder, comprising disks $a\ a'$, having their hubs $a^3\ a^4$ connected and mounted on a horizontal stud (not shown) rigidly secured to the stand, the filling carriers or bobbins being sustained at their heads and tips by the said disks, to be removed therefrom by the transferrer $f'$, all substantially as set forth in the patent referred to.

A circular plate or disk 1 is secured by its hub 2 to a stud 3, secured to the outer end of the filling-feeder at its center and of sufficient length to separate the plate a proper distance from the feeder. Said plate has its periphery notched, as at 4, (shown clearly in Fig. 2,) the notches corresponding in number to the number of filling-carrier supports in the feeder, the filling end $t$, Fig. 1, being led from a filling-carrier $b$ over the disk $a'$ to the plate 1 and laid in one of the notches 4 thereof.

On the outer face of the plate 1 I have mounted a series of holding devices or clamps, each consisting of a spring-metal body 5, having an eye at its outer end to receive the head 6 of an attaching-screw 7, the screw having an enlarged portion 8 (see Fig. 3) between the head and the threaded portion. The bodies of the clamps are radially arranged upon the plate 1, and their inner ends are laterally widened, as at 9, and turned upward at 10.

As shown in Fig. 3, the outer end of the clamp is supported on the part 8 of the screw, and the clamp is bent longitudinally, so that the wide portion or head 9 thereof is held yieldingly against the face of the guide-plate 1 by the resiliency of the metal of which the clamp is made.

A small ear 11 at the outer end of the clamp is turned down to rest against the plate 1, so that the clamp is supported by the ear and the head 9, the screw-head 6 holding the clamp firmly in position. Preferably the under side of the head 9 is flattened somewhat, as shown at 12, Fig. 3, to increase the holding area between the head and the guide-plate.

When the attendant places the filling-carriers in the feeder, he leads the filling end from each over the plate 1 in a notch 4 and then by a simple movement of the hand draws the loose end under the upturned end 10 of the nearest clamp and catches the end beneath the head 9.

In Fig. 2 I have shown a clamp as holding three filling ends, so that six clamps are sufficient for a feeder adapted to hold eighteen filling-carriers, though it will be understood that the full number can never be used at once, as a vacant space must be left for the movement of the transferrer.

The clamps can be made very cheaply and as cheaply applied, and as a filling end has to be only drawn under the head of a clamp to catch between it and the plate all twisting or winding of the filling end is obviated.

Changes may be made in the manner of securing the clamps in place or in the shape of the clamps without departing from the spirit and scope of my invention.

Having described my invention, what I claim as new, and desire to secure by Letters Patent, is—

1. A rotatable filling-feeder for automatic looms, a guide plate or disk mounted thereon at the outer end, the filling ends being led from the filling-carriers over the periphery of the plate and a series of spring-clamps attached to the outer face of the plate and adapted to hold the filling ends between the adjacent faces of the clamps and the plate.

2. A rotatable filling-feeder for automatic looms, a guide plate or disk mounted thereon at the outer end, and having peripheral notches for the filling ends and a series of spring-clamps attached to the outer face of the plate and adapted to hold the filling ends between the adjacent faces of the clamps and the plate.

3. A rotatable filling-feeder for automatic looms, adapted to contain a circularly-arranged series of filling-carriers, a guide-plate mounted on the outer end of and rotating with the feeder, and a series of radially-extended spring-clamps attached at their outer ends to the outer face of the plate, the inner ends of the clamps yieldingly resting against the plate, to hold filling ends when drawn between the inner end of a clamp and the plate.

4. A rotatable filling-feeder for automatic looms, adapted to contain a circularly-arranged series of filling-carriers, a guide-plate mounted on the outer end of and rotating with the feeder, and a series of radially-extended, resilient clamps rigidly secured at their outer ends to the plate and having their inner ends enlarged to form heads, the heads yieldingly resting against the outer face of said plate, each clamp being adapted to hold a plurality of filling ends when drawn beneath its head.

In testimony whereof I have signed my name to this specification in the presence of two subscribing witnesses.

WILLIAM OLDFIELD.

Witnesses:
JOSEPH I. DA TERRA,
RICHARD CHATBURN.